US008745582B2

(12) United States Patent
Khandelwal et al.

(10) Patent No.: US 8,745,582 B2
(45) Date of Patent: Jun. 3, 2014

(54) DESIGNER FOR WEB PAGES AT A LOCAL MACHINE

(75) Inventors: Nikhil Khandelwal, Seattle, WA (US); Joseph M. Davis, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1036 days.

(21) Appl. No.: 12/138,913

(22) Filed: Jun. 13, 2008

(65) Prior Publication Data

US 2009/0313602 A1    Dec. 17, 2009

(51) Int. Cl.
*G06F 9/44* (2006.01)

(52) U.S. Cl.
USPC ............ 717/111; 717/117; 717/124; 717/126

(58) Field of Classification Search
USPC .................. 717/111–136, 175; 709/201–205, 709/213–226
See application file for complete search history.

(56) References Cited

U.S. PATENT DOCUMENTS

| | | | |
|---|---|---|---|
| 6,760,886 B1 * | 7/2004 | Nadon et al. .................. 715/234 |
| 6,792,454 B2 | 9/2004 | Nakano et al. | |
| 7,000,184 B2 | 2/2006 | Matveyenko et al. | |
| 7,155,491 B1 * | 12/2006 | Schultz et al. ................ 709/217 |
| 7,665,064 B2 * | 2/2010 | Able et al. .................... 717/117 |
| 7,814,204 B1 * | 10/2010 | Wang et al. ................... 709/226 |
| 2004/0148307 A1 | 7/2004 | Rempell | |
| 2004/0250205 A1 * | 12/2004 | Conning ....................... 715/517 |
| 2004/0268231 A1 * | 12/2004 | Tunning ........................ 715/513 |
| 2005/0275888 A1 * | 12/2005 | Cannon et al. ............... 358/1.15 |
| 2006/0020684 A1 * | 1/2006 | Mukherjee et al. ........... 709/219 |
| 2006/0174199 A1 | 8/2006 | Soltis et al. | |
| 2006/0184818 A1 * | 8/2006 | Fujinawa .......................... 714/4 |
| 2007/0055755 A1 | 3/2007 | Sasnett et al. | |
| 2007/0220423 A1 | 9/2007 | Charbonneau et al. | |
| 2008/0046449 A1 * | 2/2008 | Lee et al. ...................... 707/100 |
| 2008/0172488 A1 * | 7/2008 | Jawahar et al. ............... 709/225 |
| 2009/0112921 A1 * | 4/2009 | Oliveira et al. ........... 707/103 R |

FOREIGN PATENT DOCUMENTS

WO       0215023       2/2002

OTHER PUBLICATIONS

Osman, Steven, et al. "The design and implementation of Zap: A system for migrating computing environments." ACM SIGOPS Operating Systems Review 36.SI (2002): 361-376.*
Yourdon, Edward. "Java, the Web, and software development." Computer 29.8 (1996): 25-30.*

(Continued)

*Primary Examiner* — Satish Rampuria
(74) *Attorney, Agent, or Firm* — Kevin Sullivan; David Andrews; Micky Minhas

(57) ABSTRACT

One embodiment includes a method that may be practiced in a computing environment. The method enables design and testing of web pages locally at a local machine. After being designed and tested at the local machine, the web pages will be deployed at a remote server remote from the local machine. The web pages include relative references to resources from the perspective of the remote server. The relative references to resources are intended to be resolved by the remote server. The method includes accessing code at a local machine. The code defines a web page. The code includes relative references to resources. The relative references are expressed from the perspective of a remote server remote from the local machine, such that the relative references are only natively resolvable by the remote server. The method further includes translating the relative references to local references. The local references are resolvable by the local machine such that the local machine can resolve the local references to the resources.

20 Claims, 2 Drawing Sheets

(56) References Cited

OTHER PUBLICATIONS

Stearn, Brent. "XULRunner: A new approach for developing rich internet applications." Internet Computing, IEEE 11.3 (2007): 67-73.*

Sun Java Studio Creator 2—Tutorials, "Deploying a Portlet to Sun Java Portal Server", Apr. 2006, 9 pages.

MacArthur, Karen, et al "PowWow—A World Wide Change Management System", Mar. 1997, 4 pages.

Brockwood, Ted, "NetObjects Fusion 4.0 Web Design Application", Web Developer's Journal, Jun. 1999, Copyright 2008 Jupitermedia Corporation, 3 pages.

Snapfiles "EngInSite Editor for PHP", Based on information and belief available, at least as early as Apr. 2, 2008, 1 page.

* cited by examiner

DESIGNER FOR WEB PAGES AT A LOCAL MACHINE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

In some environments, computers can transfer information from server machines to client machines. For example, a web server may transfer information to a client machine running an Internet browser or other access software. One example of a web server software tool is Microsoft Windows Sharepoint. Sharepoint is web server platform that can be used to build a web portal or site. A typical site can include of a number of web pages that can be custom developed and packaged as a template to work on the web server platform.

While web server software tools support web page development, they typically require a connection to a remote server machine where a server is running and only support development of web pages that already exist on the remote server. In particular, web page code implementing a web page typically includes relative references to resources where the relative reference to the resource is typically only resolvable at the server. For example, if web page code is implemented to display an image as part of a web page, the web page code for accessing the image may not include a full path expression to the location where the image is stored, but may rather implement a shortened reference based on the assumption that the image is stored at the server where the webpage code is implemented. If a call were made using the shortened reference on a machine other than the server, there would not be sufficient information to resolve the reference to obtain the desired image.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment. The method enables design and testing of web pages locally at a local machine. After being designed and tested at the local machine, the web pages will be deployed to a remote server remote from the local machine. The web pages include relative references to resources from the perspective of the remote server. The relative references to resources are intended to be resolved by the remote server. The method includes accessing code at a local machine. The code defines a web page. The code includes relative references to resources. The relative references are expressed from the perspective of a remote server remote from the local machine, such that the relative references are only natively resolvable by the remote server. The method further includes translating the relative references to local references. The local references are resolvable by the local machine such that the local machine can resolve the local references to the resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
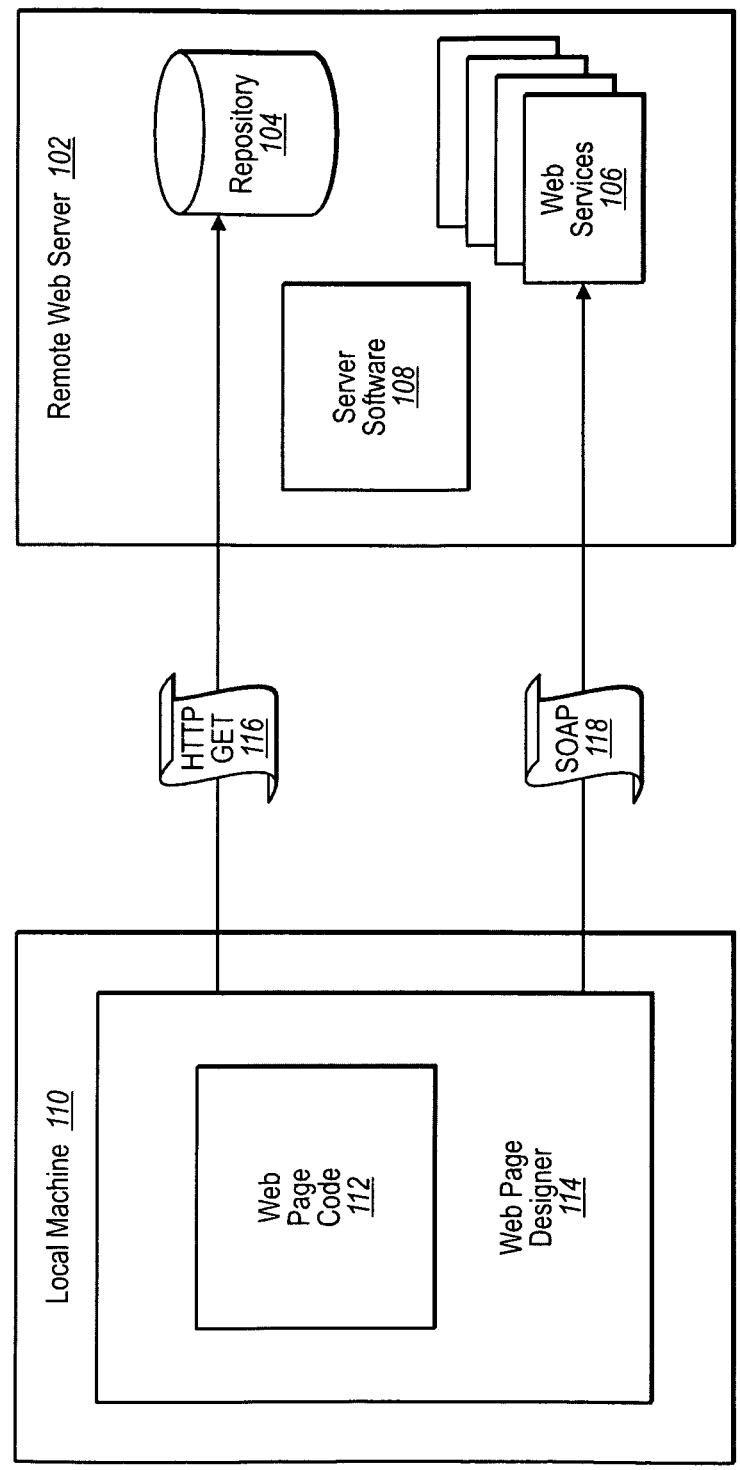
FIG. 1 illustrates a connected computing environment including a local machine and a remote web server.
Figure 2:
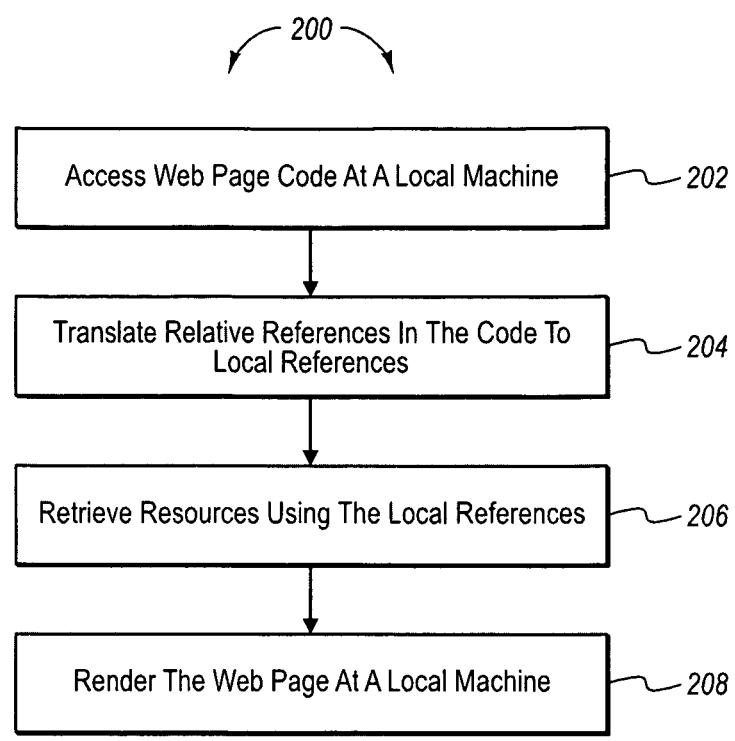
FIG. 2 illustrates a method of translating relative references to local references.

Embodiments herein may comprise a special purpose or general-purpose computer including various computer hardware, as discussed in greater detail below.

Some embodiments allow for a web page designer to be implemented at a local machine to design web pages for use at a server remote from the local machine. This may be accomplished by translating relative references to resources to local references including necessary path elements to access resources stored remote from a local machine where the web page designer is implemented. The relative references are implemented in web page code. The relative references are only natively resolvable by the server remote from the local machine. The local references are references resolvable by the local machine such that the local machine can resolve the local references to resources. For example, a relative reference to an image may be expressed in web page code intended to be implemented on a server as "images/logo.jpg" where this reference assumes that the reference will be resolved by software located at the server. Additionally, the server may be located by other machines by resolving the reference to the site contoso.com. The translation of the relative reference to a local reference to make the relative reference resolvable by the local machine, in this example, may merely include concatenating the relative reference and the site reference to the server. This concatenation results in the following reference: "contoso.com/images/logo.jpg". Other translations as described in more detail below may additionally or alternatively be used.

Designing web pages, on a local machine, where the web pages are intended to be installed on a web server, is useful for supporting reuse and better runtime performance with a template based deployment models in web server platforms. Using the designer described herein, a developer can preview the web page in full fidelity before it needs to be deployed on the web server. Once the developer has completed the design, the web page can be packaged as a template to be deployed to a web server. Additionally, a user can create a number of instances of this template to facilitate re-use of the web page program code. Further still, when deployment is done using a template model in the web server, better runtime response times can be achieved because the webpage is served from a shared template.

Some embodiments may further provide for full fidelity [WYSIWYG (what you see is what you get)] rendering of web pages under development. Specifically, web pages will be rendered during development at the local machine exactly as they will be rendered when finally deployed to the web server. This can provide a developer immediate feedback on the design before it is deployed onto the web server. In turn, this helps improve developer productivity, as there is no need to deploy the web page to the web server every time a design change is made. In particular, the developer can avoid one or more of loading the code to the remote server, installing the code at the remote server, activating the code at the remote server, or providing required permissions for implementing the code at the remote server.

Referring now to FIG. 1, an example, is illustrated. FIG. 1 illustrates a remote web server 102. Typically, the remote web server 102 has web page code stored in a repository 104 of the remote web server. One embodiment of a web page implemented using web page code is a content page with markup, such as HTML markup, and references to a master page. A typical web server page references images, stylesheets, and other resources from the web server. The repository 104 may store resources such as stylesheets (which describe how web pages are to be displayed), images that are displayed when the web page is rendered, and other resources.

A master page serves as a template for content pages. Typically, more than one content page references a master page to inherit common elements defined in that master page. Master pages are typically not stored in the repository 104, but rather are retrievable using one or more web services 106. Web services are software systems designed to support interoperable machine to machine interaction over a network. Typically, the machines communicate with one another using WSDL (Web Services Description Language) message using the SOAP (Simple Object Access Protocol) standard.

A web page in a web server can generally only be rendered only against a specific web server site. Typically, the web page has relative references to shared resources on the server remote web server 102. Thus, when a web page is implemented at a local machine 110 using web page code 112 at the local machine, a translation can be used using a context reference. In some embodiments, a context reference includes a context Universal Resource Locator (URL) to resolve these shared resources. The shared resources may be stored at, or may be accessible by, the remote web server 102. At the local machine 110, the context reference can be used to facilitate rendering the web page in the web page designer 114 at the local machine 110. The context URL may include a reference to the remote web server 102. Thus, in some embodiments, each web page has a context URL property that can be used to translate relative references at the web page code 112 so as to enable rendering of the web page using shared resources at the remote web server 102.

In some embodiments, when a user opens web page code 112 stored on the local machine 110 in the web page designer 114, the remote web server 102 site location is taken as an input and used as a context reference URL. The web designer parses the web page code 112 on the file system of the local machine 110 to generate a list of local references. Using the context reference URL and the list of references, a reference resolution process is performed to get local references, which may be absolute references or look-up references of the resources. In some embodiments, absolute references may be embodied as absolute URLs. An absolute URL may include a reference to the remote web server 102 along with a reference to a location on the remote web server 102 where resources can be found such that the absolute URL is resolvable by machines external to the remote web server 102, such as the local machine 110 to obtain the referenced resources. Lookup references may include references to one or more web services 106 at the remote web server 102, which can be used to perform token look-ups or other look-ups. Resources are then retrieved from the web server 102 using the absolute references or look-up references through one or more of SOAP web services requests, HTTP requests, or other requests.

A table of references which correlates relative references and local references may be stored at the web page designer 114. When a relative reference to a resource is encountered when parsing web page code 112, the table can be used to resolve the resource referred to in the relative reference by reference to the local reference.

Illustrating now an example, a typical web page implemented using web page code 112 has relative references to stylesheets, images etc. (referred to herein as resources). The web page designer 114 parses through the web page code's contents and performs reference resolution. In some embodiments, the reference resolution is done through a process referred to herein as a 'prefixing mechanism'. The functionality of the prefixing mechanism varies depending on the type of the referenced resource. For images or stylesheet, such as those stored in the repository 104 of the remote web server 102, a simple prefixing operation is performed. In a simple prefixing operation the context URL, e.g. the URL for the remote web server 102, is prefixed to the relative reference of the image. For example, consider a web page stored on the local file system of the local machine 110 with a relative reference to an image 'images/logo.jpg'. This relative reference is only natively resolvable and only makes sense in the context of the remote web server 102 where the image is stored in the repository 104. In this example, a context URL may be to be a web server site (contoso.com), which refers to the remote web server 102. A simple prefix operation can resolve the final image URL implemented at the local machine 110 to 'contoso.com/images/logo.jpg' which is resolvable by the local machine 110, such that the local machine can properly render the web page code 112.

While in the preceding example, simple concatenation as been shown, it should be appreciated that in other examples, HTML mechanisms may be used for resolving relative references. For example, a context URL may be the eventual location of the page, e.g. "contoso.com/subfolder/page.aspx" which is a page in a subfolder. In that case, "images/logo.jpg" will be translated to "contoso.com/subfolder/images/logo.jpg", which is also in the subfolder.

In another example, given the same context URL and the relative reference "/images/logo.jpg", after the prefixing operation, the local reference becomes "contoso.com/images/logo.jpg", which is not in the subfolder. Note that in this example, the convention of prefixing the relative reference with the leading forward slash causes the local reference to be that shown above.

For master page references, depending on the type of reference a simple prefix or a token lookup is performed. If the master page reference is a relative reference then a simple prefix operation as described earlier is done. However, if the master page reference is from a list of pre-defined tokens, a token lookup may be performed. A token lookup operation is done by searching for the referenced token from a list of pre-defined tokens and then prefixing it with the context URL. For example, a typical token for a master page is '~masterurl/default.master' which is resolved as '_catalogs/masterpage/default.master' and a prefix with the context URL would result in http: '//www.contoso.com/_catalogs/masterpage/default.master'.

Resource retrieval is the process of fetching the referenced resources from the web server site (as specified by the context URL) and storing them in a temporary location at the local machine 110. For image, stylesheet and some other resources, an HTTP GET request 116 is issued to the repository 104 at the remote web server 102 to get the files from the web server 102. In the case of master pages, a call is made to web services 106 at the web server 102 to retrieve a copy of the master page.

Once all the resources have been retrieved and delivered to the local machine 110, the web page is rendered and all controls and resources are wrapped in a web page designer 114. The web page designer 114 displays the web page just as it will look once it is deployed on the remote web server 102.

A developer can use the web page designer 114 to visually change how the page looks. Any edits to the web page code 112 are also communicated back to the remote web server 102 to get a response showing how the edits will look as if they were deployed on the remote web server 102. This gives the developer immediate feedback for a web page that is still on the file system of the local machine 110.

The following discussion now refers to a number of methods and method acts that may be performed. It should be noted, that although the method acts may be discussed or displayed in the figures in a certain order, no particular ordering is necessarily required unless specifically stated, or required because an act is dependent on another act being completed prior to the act being performed.

One embodiment includes a method 200 that may be practiced in a computing environment. The method includes acts for enabling design and testing of web pages locally at a local machine. After being designed and tested at the local machine, the web pages will be deployed to a remote server remote from the local machine. The web pages include relative references to resources from the perspective of the remote server. The relative references to resources are intended to be resolved by the remote server.

The method 200 includes accessing code at a local machine (act 202). The code defines a web page. The code includes relative references to resources. The relative references are expressed from the perspective of a remote server remote from the local machine, such that the relative references are only natively resolvable by the remote server. For example, the references to 'images/logo.jpg' and to '~masterurl/default.master' are only natively resolvable by the remote web server 102, in that the resources cannot be resolved using only the references outside of the context of the remote web server 102. In an alternative embodiment, methods may include actually generating the code at the local machine as opposed to only accessing the code.

The method 200 further includes translating the relative references to local references (act 204). The local references are references resolvable by the local machine such that the local machine can resolve the local references to the resources. As illustrated in the examples above, the translation of the relative references to local references results in the local references contoso.com/images/logo.jpg' and //www.contoso.com/_catalogs/masterpage/default.master'.

The method 200 may further include retrieving resources to the local machine using the local references (act 206) and rendering the web page at the local machine (act 208). These acts may be performed together such that rendering the web page at the local machine is performed by including acts for resolving the local references to the resources such that when the web page is rendered at the local machine, the web page will appear is if it were rendered by resolving the relative references at the remote server.

In some embodiments, rendering the web page at the local machine by resolving the local references to the resources may include sending an HTTP GET command to the remote server. For example, this may be performed to retrieve image or stylesheet resources. As illustrated in FIG. 1, an HTTP GET command may include references to a repository 104 where static resources are stored. In some embodiments rendering the web page at the local machine by resolving the local references to the resources may include sending a call to the remote server web services. In some embodiments, this may be done to retrieve a copy of a master page. For example, and as illustrated in FIG. 1, a SOAP message including a call may be sent to web services 106 stored at the remote web server 102 to obtain a master page.

As illustrated above, the method 200 may be practiced where translating the relative references to local references (act 204) include concatenating at least a portion of the relative reference with at least a portion of a context reference. The context reference may include a reference to the remote server. This is illustrated above where the references 'contoso.com' and 'images/logo.jpg' are concatenated to form the local reference 'contoso.com/images/logo.jpg'. Alternative functionality may include translating the relative references to local references by, at the local machine, providing a reference referencing a web service at the remote server. The web service at the remote server can obtain the resources such that the local machine is not required to have an absolute address to the resources.

Embodiments may also be practiced which allow for a user to modify web page code and for the code to be updated with additional translations as needed to allow the modified web page code to be properly rendered. For example, the method 200 may further include receiving user input modifying the code defining the web page and in response to the user input and the modified code, translating the modified code to create locally resolvable references.

Notably, the method can be performed so as to conserve overhead. In particular, the method 200 can be performed without loading the code defining the web page to the remote server such that overhead associated with one or more of loading the code to the remote server, installing the code at the remote server, activating the code at the remote server, or providing required permissions for implementing the code at the remote server can be avoided.

The method 200 may further include deploying the code defining the web page to the remote server. This allows the remote server to serve the web page using the relative references defined in the web page. In one embodiment, deploying the code defining the web page to the remote serve includes deploying the code defining the web page to the remote server as a template to facilitate reuse of the code defining the web page in designing web pages.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of enabling design and testing of web pages locally at a local machine, wherein after being designed and tested at the local machine, the web pages will be deployed at a remote server remote from the local machine, and where the web pages include relative references to resources from the perspective of the remote server, wherein the relative references to resources are intended to be resolved by the remote server, the method comprising:

accessing code at a local machine, the code defining a web page, wherein the code includes references to resources, each of the references comprising a relative reference or a token, the references being expressed from the perspective of a remote server remote from the local machine, providing that the references are natively resolvable only by the remote server;

for each reference, determining whether the each reference comprises a relative reference or a token;

for each token, performing a token lookup by searching for the each token in a list of pre-defined tokens, each pre-defined token being associated with a context Universal Resource Locator (URL);

maintaining a table of references which correlates the relative references and local references providing that when one or more of the relative references is encountered when parsing the code, the table is used to resolve the one or more of the relative references;

translating the relative references to local references which are references resolvable by the local machine providing that the local machine is enable to resolve the local references to the resources, wherein translating the relative references comprises:

concatenating at least a portion of one or more of the relative references with at least a portion of a context reference, the context reference comprising a reference to the remote server; and for the one or more relative references, providing a reference referencing a web service at the remote server, where the web service at the remote server is enable to obtain the resources providing that the local machine is not required to have an absolute address to the resources;

wrapping the web page, including the relative references translated to local references and tokens replaced with the associated context URL, in a web page designer providing that a developer is enable to use the web page designer to visually change how the web page looks, wherein edits to the web page are communicated back to the remote server to get a response from the remote server showing how the edits will look as if they were deployed on the remote server thereby giving the developer immediate feedback for the edited web page; and rendering the web page in full fidelity at the local machine by resolving the local references to the resources providing that when the web page is rendered at the local machine, the web page will appear as if it were rendered by resolving the relative references at the remote server, including:

resolving one or more local references to one or more resources by sending an HTTP GET command to the remote server to retrieve image or stylesheet resources; and resolving one or more local references to one or more resources by sending a call to the remote server web services to retrieve a copy of a master page.

2. The method of claim 1, further comprising retrieving resources to the local machine using the local references.

3. The method of claim 1, further comprising rendering the web page in full fidelity at the local machine by resolving the local references to the resources providing that when the web page is rendered at the local machine, the web page will appear as if it were rendered by resolving the relative references at the remote server.

4. The method of claim 3, wherein rendering the web page at the local machine by resolving the local references to the resources comprises sending an HTTP GET command to the remote server to retrieve image or stylesheet resources.

5. The method of claim 3, wherein rendering the web page at the local machine by resolving the local references to the resources comprises sending a call to the remote server web services to retrieve a copy of a master page.

6. The method of claim 1, wherein the method is performed without loading the code defining the web page to the remote server, providing that overhead associated with one or more of loading the code to the remote server, installing the code at the remote server, activating the code at the remote server, or providing required permissions for implementing the code at the remote server is enable to be avoided.

7. The method of claim 1, wherein translating the relative references to local references comprises concatenating at least a portion of the relative reference with at least a portion of a context reference, the context reference comprising a reference to the remote server.

8. The method of claim 1, wherein translating the relative references to local references comprises, at the local machine, providing a reference referencing a web service at the remote server, where the web service at the remote server is enable to obtain the resources providing that the local machine is not required to have an absolute address to the resources.

9. The method of claim 1, wherein the resources comprise one or more of an image, a stylesheet, or a master page.

10. The method of claim 1, further comprising:
receiving user input modifying the code defining the web page, the input including additional relative references to additional resources, the additional relative references being expressed from the perspective of the remote server remote from the local machine, providing that the additional relative references are only natively resolvable by the remote server; and
in response to the user input and the modified code, translating the modified code to create additional locally resolvable references.

11. The method of claim 10, further comprising:
retrieving the additional resources by sending requests to the remote server; and
rendering the additional resources at the local machine.

12. The method of claim 1, further comprising deploying the code defining the web page to the remote server.

13. The method of claim 12, wherein deploying the code defining the web page to the remote serve comprises deploying the code defining the web page to the remote server as a template to facilitate reuse of the code defining the web page in designing web pages.

14. In a computing environment, a method of designing web pages locally at a local machine, wherein after being designed at the local machine, the web pages will be deployed at a remote server remote from the local machine the method comprising:
generating code at a local machine, the code defining a web page, wherein the code includes references to resources, each of the references comprising a relative reference or a token, the references being expressed from the perspective of a remote server remote from the local machine, providing that the references are natively resolvable only by the remote server;
for each reference, determining whether the each reference comprises a relative reference or a token;
for each token, performing a token lookup by searching for the each token in a list of pre-defined tokens, each pre-defined token being associated with a context URL;
maintaining a table of references which correlates the relative references and local references providing that when one or more of the relative references is encountered when parsing the code, the table is used to resolve the one or more of the relative references;
translating the relative references to local references which are references resolvable by the local machine providing that the local machine is enable to resolve the local references to the resources, wherein translating the relative references comprises:
concatenating at least a portion of one or more of the relative references with at least a portion of a context reference, the context reference comprising a reference to the remote server; and
for the one or more relative references, providing a reference referencing a web service at the remote server, where the web service at the remote server is enable to obtain the resources providing that the local machine is not required to have an absolute address to the resources;
retrieving the resources from the remote server using the local references;
wrapping the web page, including the relative references translated to local references and tokens replaced with the associated context URLs, in a web page designer providing that a developer is enable to use the web page designer to visually change how the web page looks, wherein edits to the web page are communicated back to the remote server to get a response from the remote server showing how the edits will look as if they were deployed on the remote server thereby giving the developer immediate feedback for the edited web page; and
rendering the resources in the web page;
rendering the web page in full fidelity at the local machine by resolving the local references to the resources providing that when the web page is rendered at the local machine, the web page will appear as if it were rendered by resolving the relative references at the remote server, including:
resolving one or more local references to one or more resources by sending an HTTP GET command to the remote server to retrieve image or stylesheet resources; and
resolving one or more local references to one or more resources by sending a call to the remote server web services to retrieve a copy of a master page.

15. The method of claim 14, further comprising:
receiving user input modifying the code defining the web page, the input including additional relative references to additional resources, the additional relative references being expressed from the perspective of the remote server remote from the local machine, providing that the additional relative references are only natively resolvable by the remote server; and
in response to the user input and the modified code, translating the modified code to create additional locally resolvable references.

16. The method of claim 15, further comprising:
retrieving the additional resources by sending requests to the remote server; and
rendering the additional resources at the local machine.

17. The method of claim 14, wherein translating the relative references to local references comprises concatenating at least a portion of the relative reference with at least a portion of a context reference, the context reference comprising a reference to the remote server.

18. The method of claim 14, wherein translating the relative references to local references comprises, at the local machine, providing a reference referencing a web service at the remote server, where the web service at the remote server is enable to obtain the resources providing that the local machine is not required to have an absolute address to the resources.

19. In a computing environment, a method of enabling design and testing of web pages locally at a local machine, wherein after being designed and tested at the local machine, the web pages will be deployed at a remote server remote from the local machine, and where the web pages include relative references to resources from the perspective of the remote server, wherein the relative references to resources are intended to be resolved by the remote server, the method comprising:

accessing code at a local machine, the code defining a web page, wherein the code includes references to resources, each of the references comprising a relative reference or a token, the references being expressed from the perspective of a remote server remote from the local machine, providing that the references are natively resolvable only by the remote server;

for each reference, determining whether the each reference comprises a relative reference or a token;

for each token, performing a token lookup by searching for the each token in a list of pre-defined tokens, each pre-defined token being associated with a context Universal Resource Locator (URL);

maintaining a table of references which correlates the relative references and local references providing that when one or more of the relative references is encountered when parsing the code, the table is used to resolve the one or more of the relative references;

translating the relative references to local references which are references resolvable by the local machine providing that the local machine is enable to resolve the local references to the resources, wherein translating the relative references comprises:

concatenating at least a portion of one or more of the relative references with at least a portion of a context reference, the context reference comprising a reference to the remote server; and for the one or more relative references, providing a reference referencing a web service at the remote server, where the web service at the remote server is enable to obtain the resources providing that the local machine is not required to have an absolute address to the resources;

wrapping the web page, including the relative references translated to local references and tokens replaced with the associated context URL, in a web page designer providing that a developer is enable to use the web page designer to visually change how the web page looks, wherein edits to the web page are communicated back to the remote server to get a response from the remote server showing how the edits will look as if they were deployed on the remote server thereby giving the developer immediate feedback for the edited web page; and rendering the web page in full fidelity at the local machine by resolving the local references to the resources providing that when the web page is rendered at the local machine, the web page will appear as if it were rendered by resolving the relative references at the remote server, including:

resolving one or more local references to one or more resources by sending an HTTP GET command to the remote server to retrieve image or stylesheet resources; and resolving one or more local references to one or more resources by sending a call to the remote server web services to retrieve a copy of a master page.

20. The method of claim 19, wherein the method is performed by executing instructions stored on a computer readable hardware storage device.

* * * * *